United States Patent [19]
Kajimoto et al.

[11] Patent Number: 5,555,453
[45] Date of Patent: Sep. 10, 1996

[54] RADIO COMMUNICATION SYSTEM

[75] Inventors: Shigeki Kajimoto, Sakai; Weimin Sun, Ikoma-gun, both of Japan

[73] Assignee: Icom Incorporated, Osaka, Japan

[21] Appl. No.: 406,661

[22] Filed: Mar. 20, 1995

[30] Foreign Application Priority Data

Dec. 27, 1994 [JP] Japan ................... 6-324661

[51] Int. Cl.$^6$ ................. H04B 1/06; H04B 7/00
[52] U.S. Cl. ............. 455/266; 455/37.1; 455/307; 455/340
[58] Field of Search .................. 455/266, 37.1, 455/313, 180.1, 200.1, 189.1, 196.1, 339, 309, 312, 307, 316, 340, 192.1, 256; 375/344, 350

[56] References Cited

U.S. PATENT DOCUMENTS

| | | | |
|---|---|---|---|
| 4,475,242 | 10/1984 | Rafal et al. | 455/53.1 |
| 5,179,727 | 1/1993 | Imagawa | 455/340 |
| 5,193,223 | 3/1993 | Walczak et al. | 455/127 |
| 5,263,187 | 11/1993 | Sugawa et al. | 455/266 |
| 5,303,404 | 4/1994 | Kivela | 455/266 |

FOREIGN PATENT DOCUMENTS

| | | |
|---|---|---|
| 63-50893 | 10/1988 | Japan . |
| 3-26693 | 6/1991 | Japan . |

*Primary Examiner*—Reinhard J. Eisenzopf
*Assistant Examiner*—Gertrude Arthur
*Attorney, Agent, or Firm*—Frishauf, Holtz, Goodman, Langer & Chick

[57] ABSTRACT

A CW (Continuous Wave) radio frequency signal converted to an IF (Intermediate Frequency) signal is mixed with a local oscillator signal by an IF mixer, and the obtained signal is converted to a digital signal by an ADC (Analog-to-Digital Converter). A digital bandpass filter passes only the target component in the output of the ADC. The passed IF signal is demodulated by a digital demodulator, and the demodulated signal is converted to an analog signal before being output as a sound. When pitch control to increase the reception pitch by $\Delta f$ is instructed, an MPU (Microprocessor Unit) alters the frequency of the local oscillator signal by $\Delta f$ as well as the center frequency of the digital bandpass filter by $\Delta f$, so that the center frequency of the input signal to a narrow-band filter coincides with the center frequency of the digital bandpass filter.

4 Claims, 5 Drawing Sheets

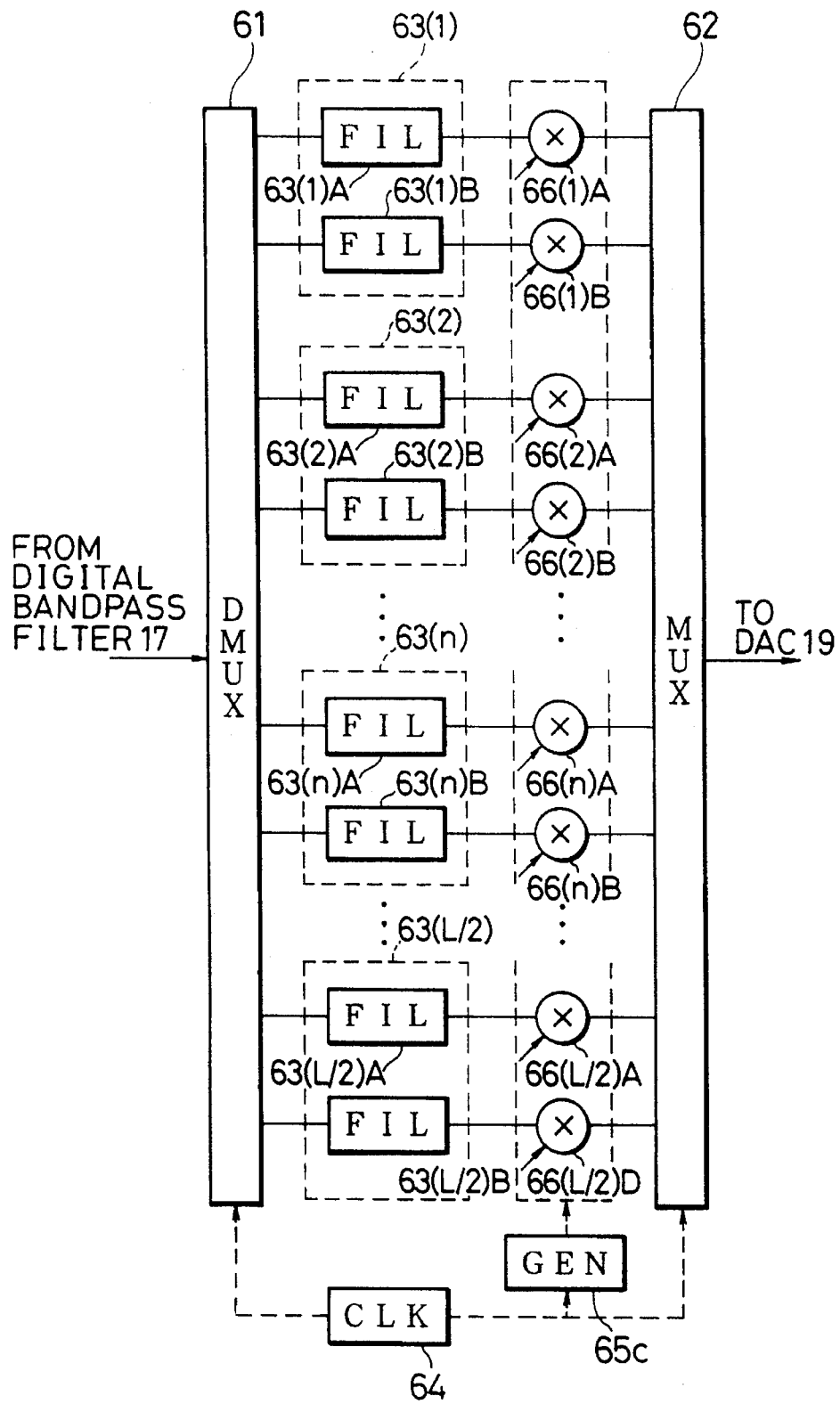
F I G. 4

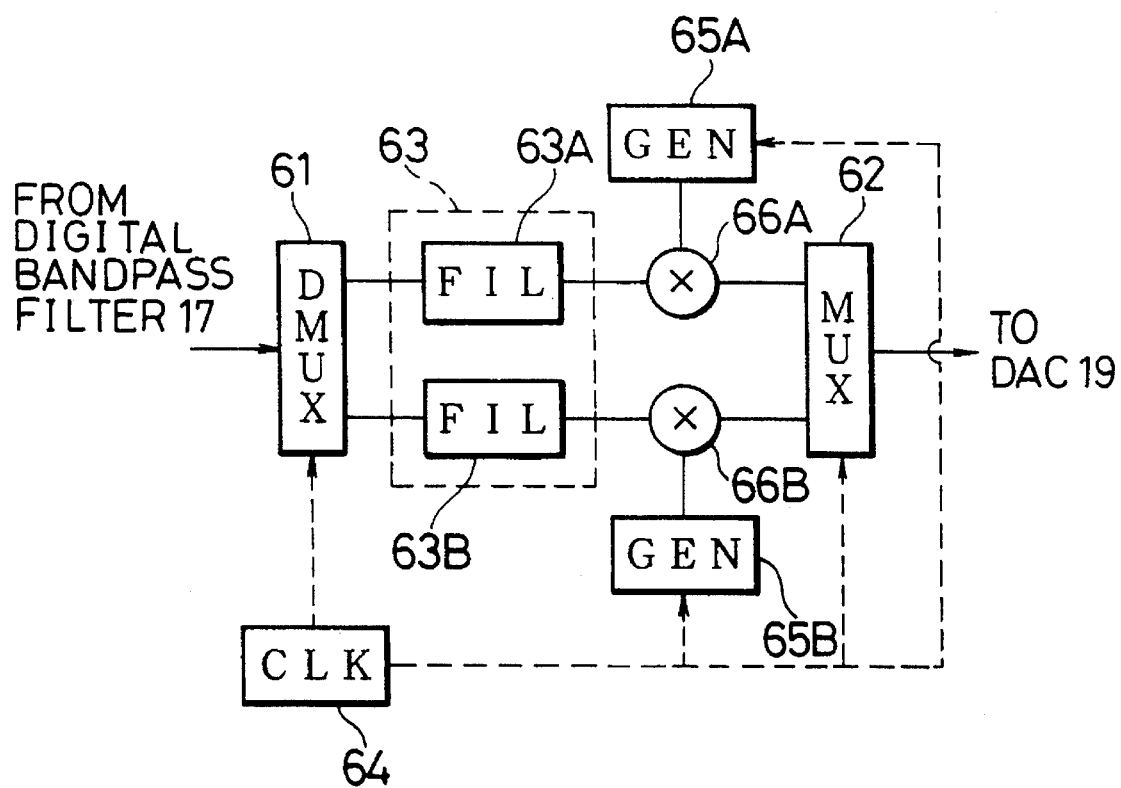
F I G. 5

RADIO COMMUNICATION SYSTEM

BACKGROUND OF THE INVENTION

1. Field of the Invention

The present invention relates to a radio communication system, and, more particularly, to a CW (Continuous Wave morse telegrphy) radio communication system which has a pitch control function and demodulates a received signal using digital signal processing.

2. Description of the Related Art

Conventionally, CW radio communication system are designed to be able to adjust a pitch (frequency of a demodulated signal) desirable by an operator by varying a frequency of a oscillated signal of a BFO (Beat-Frequency Oscillator).

Also known are CW radio communication system which employ a narrow-band filter such as an audio peak filter (APF) when receiving a CW to attenuate signals having other frequencies than the target frequency in order to reduce interference or noise.

The CW radio communication system using a narrow-band filter are disclosed in, for example, Japanese Examined Utility Model Publication No. hei 3-26693 and Japanese Examined Patent Publication No. sho 63-50893.

The CW radio communication system disclosed in the Japanese Examined Utility Model Publication No. hei 3-26693 has a narrow-band filter located at the subsequent stage of an intermediate frequency amplifier (IF-AMP) and an intermediate frequency mixer (IF-MIX). This CW radio communication system has a function to alter the local oscillator frequency input to the IF-MIX or to shift the center frequency of the narrow-band filter so that the center frequency of the narrow-band filter coincides with the frequency of an intermediate frequency signal (IF signal).

The radio communication system disclosed in the Japanese Examined Patent Publication No. sho 63-50893 has a narrow-band filter provided at the output stage of a beat-frequency oscillator and changes the frequency of the beat-frequency oscillator (BFO frequency) and the center frequency of the narrow-band filter by equal amounts in the same direction, so that the frequency of a demodulated signal coincides with the center frequency of the narrow-band filter.

In the radio communication system disclosed in the Japanese Examined Utility Model Publication No. hei 3-26693, if the local oscillator frequency is changed, the frequency of the demodulated signal does not match with the center frequency of the narrow-band filter and a demodulated signal is not output. This requires the readjustment of the center frequency of the narrow-band filter.

As the center frequency of the narrow-band filter and the frequency of the IF signal are adjusted using a variable element, it is difficult to make the center frequency of the narrow-band filter coincide with the frequency of the IF signal in responsive to each other.

In the radio communication system disclosed in the Japanese Examined Patent Publication No. sho 63-50893, the center frequency of the narrow-band filter and the BFO frequency are changed by equal amounts in the same direction. Even if the BFO frequency is changed, therefore, the readjustment of the center frequency of the narrow-band filter is unnecessary. Since signal processing is all performed on the analog base, the BFO frequency cannot be tuned to the center frequency of the narrow-band filter accurately.

In either method, when the center frequency of the narrow-band filter is changed, the bandwidth is also changed. From the viewpoint of the precision in the responsive tuning, it is difficult to set the frequency too narrow and it is difficult to improve the selectivity.

SUMMARY OF THE INVENTION

Accordingly, it is an object of the present invention to provide a CW radio communication system which requires no readjustment of the center frequency of a narrow-band filter in use at the time the pitch is adjusted, and which uses a digital signal processing technique to improve the selectivity and the SN (Signal-to-Noise) ratio.

To achieve this object, a radio communication system according to one aspect of this invention comprises:

reception means for receiving a radio frequency signal and outputs a received signal;

a variable frequency local oscillator;

a mixer for mixing the received signal from the reception means with a local oscillator signal from the variable frequency local oscillator;

an analog-digital converter for converting an output signal of the mixer to a digital signal;

a variable center frequency digital bandpass filter for filtering an output signal of the analog-digital converter;

a digital demodulator for demodulating an output signal of the digital bandpass filter; and control means for changing a frequency of the local oscillator signal by $\Delta f$ and changing a center frequency of the digital bandpass filter by $\Delta f$ in accordance with an externally supplied control signal to cause a frequency of the output signal of the mixer coincide with the center frequency of the digital bandpass filter.

This radio communication system may further comprise a digital-analog converter for converting a digital output signal of the digital demodulator to an analog signal;

amplifying means for amplifying an output signal of the digital-analog converter;

means for converting an output signal of the amplifying means to an audible sound and outputting the audible sound; and means for supplying the control signal to the control means.

A radio communication system according to another aspect of this invention comprises:

reception means for receiving a continuous wave radio frequency signal and outputs a received signal;

a variable frequency local oscillator;

a mixer for mixing the received signal from the reception means with a local oscillator signal from the variable frequency local oscillator;

an analog-digital converter for converting an output signal of the mixer to a digital signal;

a variable center frequency digital bandpass filter for filtering an output signal of the analog-digital converter;

a digital demodulator for demodulating an output signal of the digital bandpass filter;

a means for inputting a pitch control signal; and control means for changing a frequency of the local oscillator signal and changing a center frequency of the digital bandpass filter in accordance with the pitch control signal.

This radio communication system may further comprise a digital-analog converter for converting a digital output signal of the digital demodulator to an analog signal;

amplifying means for amplifying an output signal of the digital-analog converter; and means for converting an output signal of the amplifying means to an audible sound and outputting the audible sound.

The radio communication system with the above structures can attenuate an interference whose frequency is around a target frequency to thereby receive a target signal with high sensitivity.

In accordance with a change in the frequency of the variable frequency local oscillator, the center frequency of the digital bandpass filter is also changed to alter the pitch (the frequency of the demodulated signal). It is therefore possible to always match the frequency of a demodulated signal with the center frequency of the digital bandpass filter. Even if the pitch is changed, therefore, the target signal is not attenuated, thus eliminating the need for frequency tuning again.

Further, the variable center frequency digital bandpass filter is located at the preceding stage of the digital demodulator. With the carrier frequency set to $f_s/4$ ($f_s$ is the sampling frequency), particularly, therefore, the bandwidth does not change even if the center frequency is changed and the filter shape hardly changes. If the coefficient of the digital filter is previously determined by an approximation equation, the correction of the filter coefficient is required less.

BRIEF DESCRIPTION OF THE DRAWINGS

FIG. 4 is a diagram showing an example of a digital demodulator shown in FIG. 1; and FIG. 5 is a diagram exemplifying the structure of the digital demodulator shown in FIG. 4.

DETAILED DESCRIPTION OF THE PREFERRED EMBODIMENT

A CW radio communication system according to one embodiment of the present invention will now be described referring to the accompanying drawings.

Figure 1:
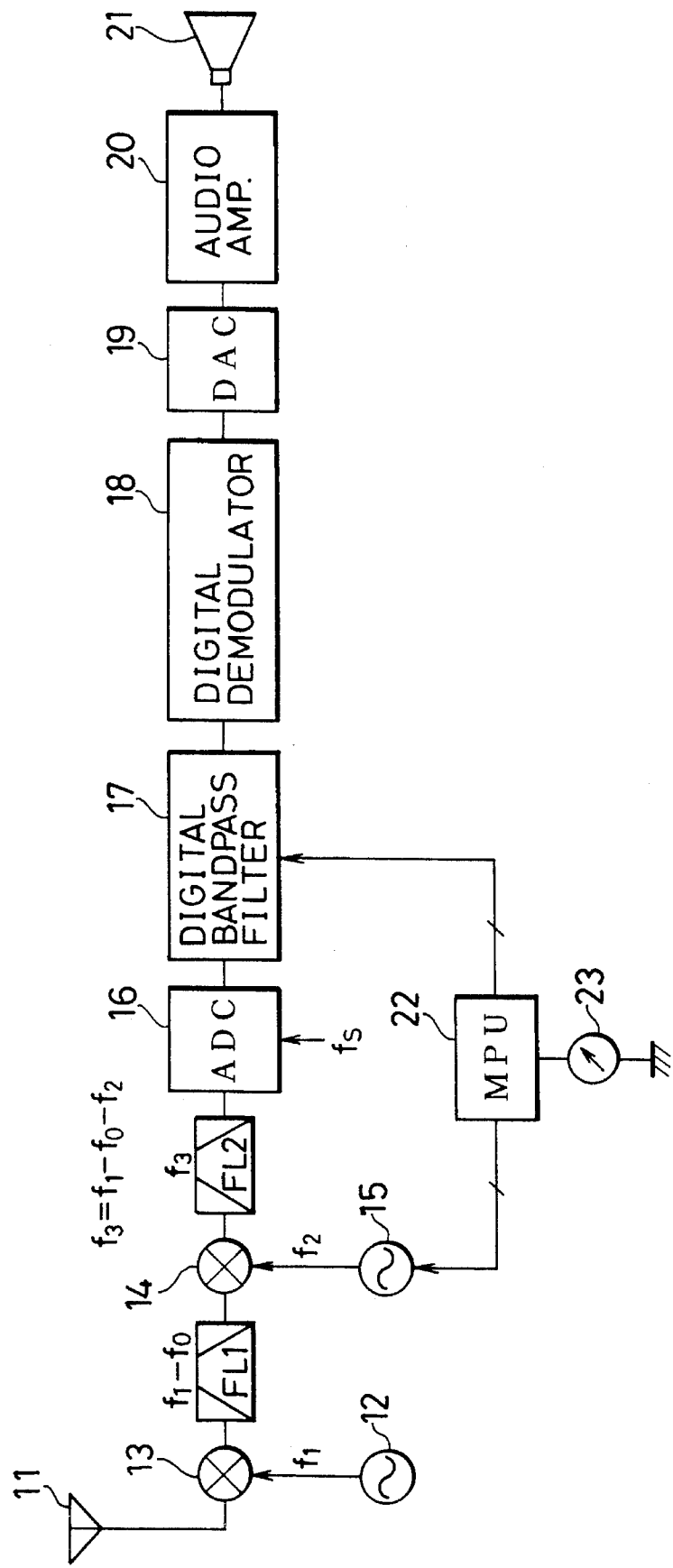
FIG. 1 is a block diagram illustrating the structure of a CW radio communication system according to one embodiment of the present invention.

FIG. 1 presents a block diagram illustrating the structure of the CW radio communication system according to this embodiment.

As illustrated, this CW radio communication system comprises an antenna 11, a first local oscillator (first LO) 12, a radio frequency mixer (RF-MIX) 13, an analog bandpass filter FL1, an intermediate frequency mixer (IF-MIX) 14, a second local oscillator (second LO) 15, an analog bandpass filter FL2, an analog-digital converter (ADC) 16, a digital bandpass filter 17, a digital demodulator 18, a digital-analog converter (DAC) 19, an audio frequency amplifier (AF-AMP) 20, a loudspeaker 21, a microprocessor unit (MPU) 22, and a sensor 23.

The first LO 12 is constituted of a variable frequency oscillator such as a PLL (Phase Locked Loop) circuit, and outputs a first local oscillator signal having a frequency $f_1$ of 70.1 to 100 MHz in accordance with, for example, the manipulation by a user.

The RF-MIX 13 mixes an RF (Radio Frequency) signal from the antenna 11, which has a frequency $f_0$ of, for example, 0.1 to 30 MHz with the first local oscillator signal having the frequency $f_1$, and outputs a first intermediate frequency signal (first IF signal) having a frequency $(f_1-f_0)$.

The unwanted signal components (spurious) of the first IF signal from the RF-MIX 13 are attenuated by the analog bandpass filter FL1 having the center frequency of 70 MHz and the bandwidth of 15 kHz.

The second LO 15 is constituted of a variable frequency oscillator such as a PLL circuit, oscillates at a frequency $f_2$ of, for example, 69.975 MHz specified by the MPU 22, and sends a second local oscillator signal to the IF-MIX 14.

The IF-MIX 14 mixes the first IF signal with the second local oscillator signal, yielding a second intermediate frequency signal (second IF signal) having a frequency $f_3$ of, for example, 0.025 MHz (25 kHz). The unwanted signal component of this second IF signal is attenuated by the analog bandpass filter FL2 having the center frequency of 0.025 MHz and the bandwidth of 6 kHz, and the obtained signal is supplied to the ADC 16.

The ADC 16 samples the second IF signal, having passed through the analog bandpass filter FL2, in accordance with an externally supplied sampling signal having a frequency $f_s$ (e.g., 100 kHz) to convert it to a digital signal.

The digital bandpass filter 17 has a passband whose center frequency is 25 kHz–800 Hz (when the second IF signal from the IF-MIX 14 is demodulated on the LSB side) or 25 kHz+ 800 Hz (when the second IF signal from the IF-MIX 14 is demodulated on the USB side), for example. This digital bandpass filter 17 has a relatively narrow passband, e.g., 40-Hz bandwidth to 800-Hz bandwidth, and is of the center frequency variable type. The digital bandpass filter 17 filters a signal from the ADC 16 to attenuate the unwanted signal component.

The digital demodulator 18 demodulates a digital signal from the digital bandpass filter 17 to a digital audio signal having an audio frequency of about 0 to 3 kHz. The demodulated digital audio signal is converted to an analog signal having the associated frequency by the DAC 19. This analog signal is amplified by the AF-AMP 20 and the amplified signal is sent to the loudspeaker 21 to be converted to an audible signal.

The sensor 23, which is manipulatable by, for example, the user, sends a pitch control signal to the MPU 22. In the case where the second IF signal from the IF-MIX 14 is received on the LSB side, when the pitch control signal indicating an increase (or reduction) of the pitch by $\Delta f$ is supplied from the sensor 23, the MPU 22 outputs control data to the second LO 15, such as data indicating a frequency-division ratio, to increase (or decrease) the frequency $f_2$ of the second LO 15 by $\Delta f$. As a result, the frequency of the second IF signal from the IF-MIX 14 becomes lower (or higher) by $\Delta f$. At the same time, the MPU 22 instructs the digital bandpass filter 17 to reduce (or increase) its center frequency by $\Delta f$.

In the case where the second IF signal from the IF-MIX 14 is received on the USB side, when the pitch control signal indicating an increase (or reduction) of the pitch by $\Delta f$ is supplied from the sensor 23, the MPU 22 outputs control data to the second LO 15, to decrease (or increase) the frequency $f_2$ of the second LO 15 by $\Delta f$. As a result, the frequency of the second IF signal from the IF-MIX 14 becomes higher (or lower) by $\Delta f$. At the same time, the MPU 22 instructs the digital bandpass filter 17 to increase (or reduce) its center frequency by Δf.

With the above-described structure, when the pitch is changed, the center frequency of the digital bandpass filter 17 is also changed by the same amount, so that the frequency of a demodulated signal is always in tune with the center frequency of the digital bandpass filter 17.

A description will now be given of the receiving operation of the thus constituted CW radio communication system in the case where a CW radio frequency signal having a carrier frequency of 10 MHz is demodulated at 800 Hz.

In this case, the frequency $f_1$ of the first LO 12 is set to 80 MHz. The RF-MIX 13 converts the received signal having the frequency $f_1$ to the first IF signal having the frequency $(f_1-f_0)$. That is, the RF-MIX 13 converts the received signal having a frequency of 10 MHz to the first IF signal of 70 MHz (= 80 MHz–10 MHz). The first IF signal of 70 MHz is filtered by the analog bandpass filter FL1.

The IF-MIX 14 converts the first IF signal having a frequency $(f_1-f_0)$ to the second IF signal having a frequency $(f_1-f_0-f_2)$. Given that the frequency $f_2$ of the second local oscillator signal is 69.975 MHz, that is, the IF-MIX 14 converts the first IF signal of 70 MHz to the second IF signal of 25 kHz (= 70 MHz–69.975 MHz) and outputs the second IF signal. The second IF signal of 25 kHz is filtered by the analog bandpass filter FL2.

The signal from the analog bandpass filter FL2 is converted by the ADC 16 to a digital signal which is in turn supplied to the digital bandpass filter 17. To demodulate the second IF signal from the IF-MIX 14 on the LSB side, the frequency $f_2$ of the second local oscillator signal is set to 69.9758 MHz, and the digital bandpass filter 17 has a passband whose center frequency is 25 kHz–800 Hz, the frequency of the carrier signal shifted lower by the pitch, and passes a signal of a predetermined band on the LSB side.

The digital demodulator 18 demodulates the second IF signal from the digital bandpass filter 17, to a digital AF (Audio Frequency) signal. For example, the second IF signal of 24.2 kHz is demodulated to a digital audio signal of 800 Hz. The digital audio signal is converted to an analog audio signal by the DAC 19, and the obtained signal is amplified by the AF-AMP 20. The amplified signal is sent to the loudspeaker 21 to be converted to an audible signal.

If the user manipulates the sensor 23 so that the pitch is lowered by 100 Hz (the demodulation is conducted at the pitch of 700 Hz), the MPU 22 reduces the frequency $f_2$ of the second LO 15 by 100 Hz in the case where the second IF signal from the IF-MIX 14 is demodulated on the LSB side. As a result, the frequency of the second IF signal from the IF-MIX 14 becomes higher by 100 Hz to be 25 kHz–700 Hz. Meanwhile, the MPU 22 increases the center frequency of the digital bandpass filter 17 by 100 Hz to 25 kHz–800 Hz+ 100 Hz, so that this frequency coincides with the frequency of the second IF signal to be input.

In the case where the second IF signal from the IF-MIX 14 is demodulated on the USB side, the frequency $f_2$ of the second LO 15 is set to 69.9743 MHz. Accordingly, the frequency of the second IF signal from the IF-MIX 14 becomes lower than 25.8 kHz by 100 Hz and becomes 25 kHz+ 700 Hz. Meanwhile, the MPU 22 reduces the center frequency of the digital bandpass filter 17 by 100 Hz to 25 kHz+ 800 Hz–100 Hz, so that this frequency coincides with the frequency of the second IF signal to be input.

According to the CW radio communication system of this embodiment, therefore, the frequency of the second IF signal from the IF-MIX 14 coincides with the center frequency of the digital bandpass filter 17. Even when CW pitch control is performed, therefore, the target CW signal is not attenuated and can be received at the optimal reception state.

Further, a narrow-band filter can be located at the intermediate frequency (IF) stage before the demodulator (detector), particularly, in the frequency range of $f_s/4$, the selectivity can be improved by the digital filter to provide a reproduction signal free of interference or noise. Furthermore, even if the center frequency of the bandpass filter is changed, the filter shape hardly changes. If the filter coefficient is previously determined by an approximation equation, the correction of the filter coefficient is required less.

Figure 2:
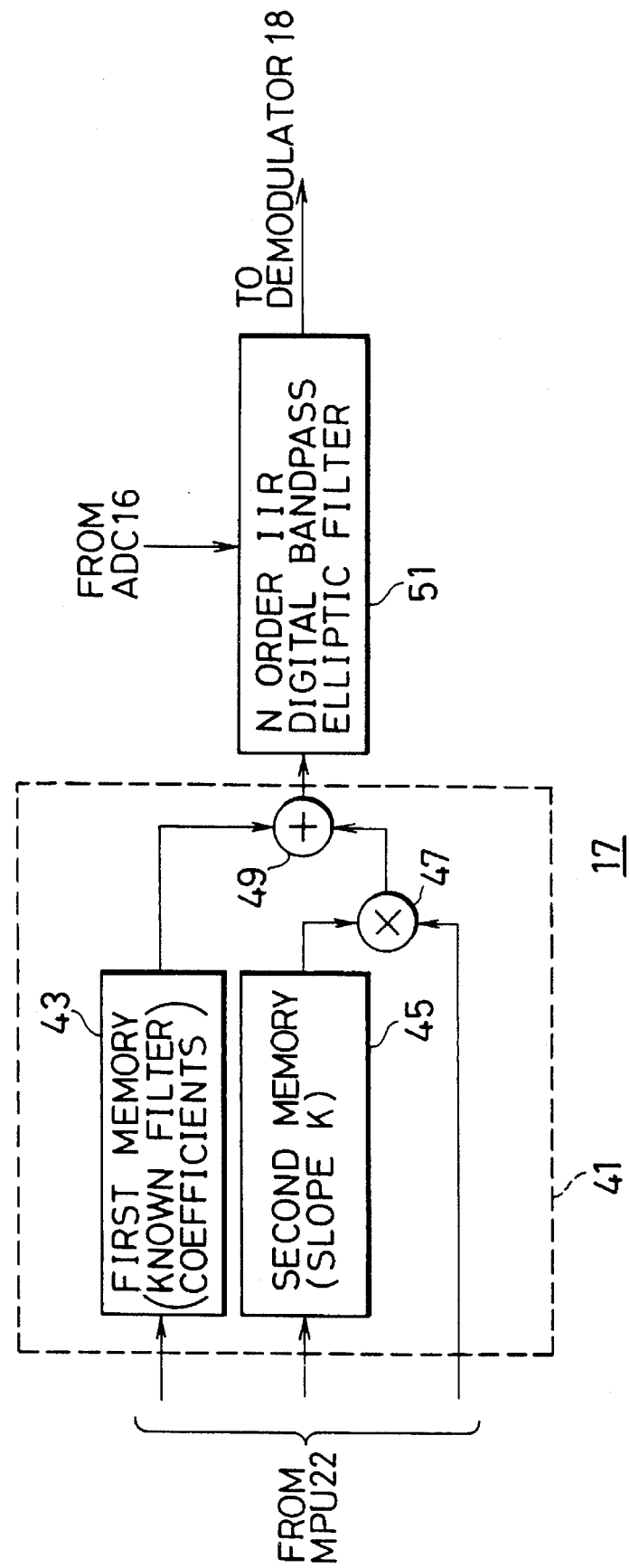
FIG. 2 is a diagram showing the structure of a digital filter shown in FIG. 1.
Figure 3:
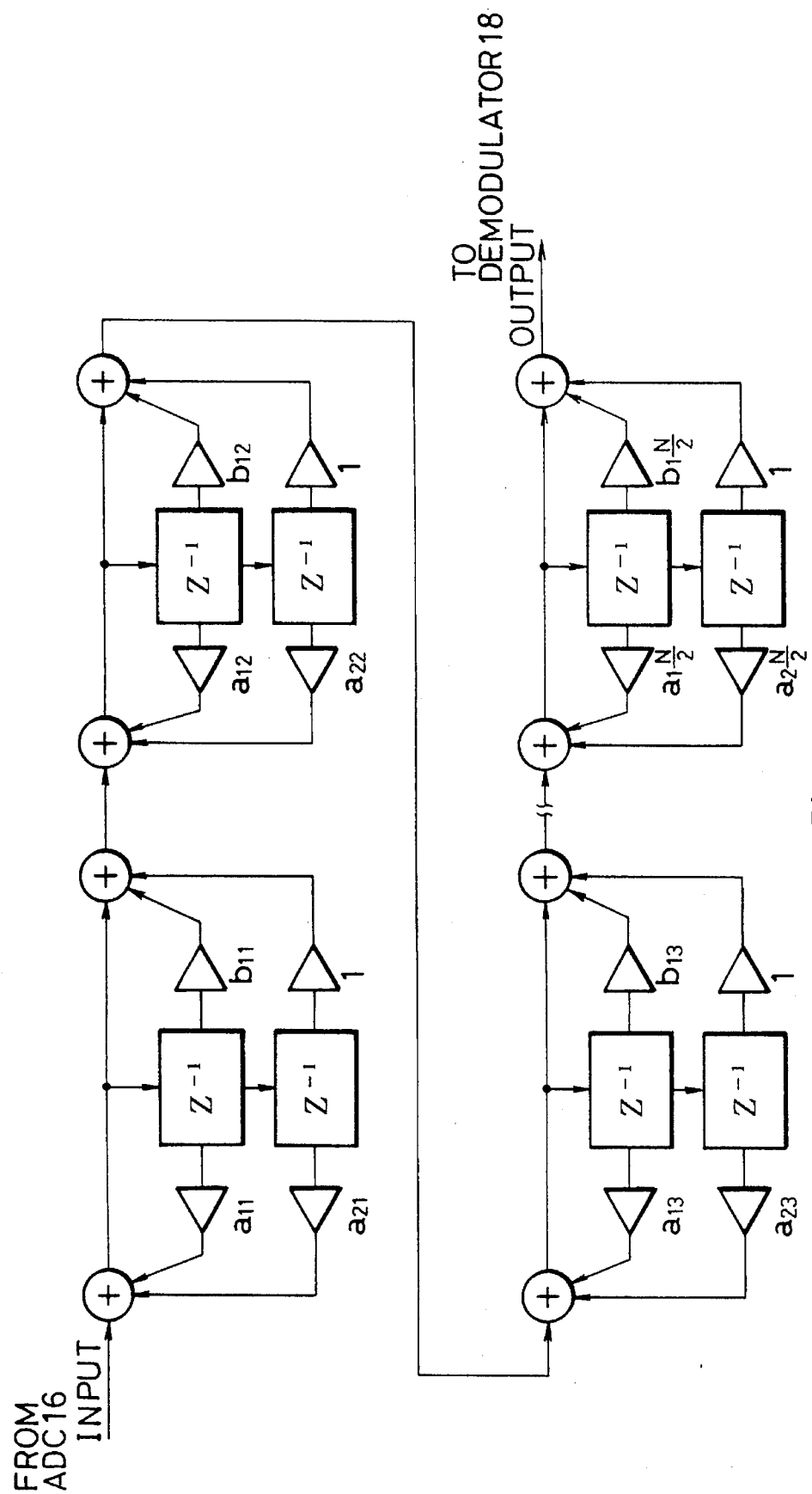
FIG. 3 is a diagram exemplifying the structure of an N-order IIR digital bandpass elliptic filter.

An example of the structure of the digital bandpass filter 17 shown in FIG. 1 will be described with reference to FIGS. 2 and 3. The digital bandpass filter shown in FIGS. 2 and 3 is described in the U.S. patent application Ser. No. 08/322, 795 filed on Oct. 13, 1994. The contents of the application is incorporated to this specification by the reference.

As shown in FIG. 2, the digital bandpass filter 17 has a coefficient calculating unit 41 and an N-order IIR digital bandpass elliptic filter 51. The coefficient calculating unit 41 comprises a first memory 43, a second memory 45, a multiplier 47, and adder 49.

The N-order IIR digital bandpass elliptic filter 51 has N/2 two-order IIR filter sections connected in cascade form as shown in, for example, FIG. 3.

With the use of the bandpass elliptic filter having the structure shown in FIG. 3, the filter coefficient $b_{2i}$ is almost "1". Given that the passband width is constant, the individual filter coefficients $a_{1i}$, $a_{2i}$ and $b_1$ become linear functions of the approximately normalized center frequency (the center frequency of the sampling frequency taken as "1"). The transfer function of the digital bandpass elliptic filter shown in FIG. 3 is expressed by an equation 1 below.

$$H(\omega) = \prod_{i=1}^{N/2} \frac{1 + b_{1i}(f_c)e^{-j\omega t} + e^{-2j\omega t}}{1 + a_{1i}(f_c)e^{-j\omega t} + a_{2i}(f_c)e^{-2j\omega t}} \quad (1)$$

where $f_c$ is the normalized center frequency ($0 < f_c < 0.5$) of the passband, and $a_{1i}(f_c)$, $a_{2i}(f_c)$ and $b_{1i}(f_c)$ indicate that filter coefficients $a_{1i}$, $a_{2i}$ and $b_{1i}$ are linear functions of the normalized center frequency $f_c$.

If the bandwidth of this digital bandpass elliptic filter is $\Delta f_B$ and the normalized center frequency $f_c$ changes from $f_1$ to $f_2$, $0 < f_1 < f_2 < 0.5$, $0 < f_1 - \Delta f_B/2$, and $f_2 + \Delta f_B/2 < 0.5$ are satisfied.

The filter coefficients $a_{1i}(f_c)$, $a_{2i}(f_c)$ and $b_{1i}(f_c)$ are linear functions of the center frequency $f_c$. If the amount of a change in each filter coefficient with respect to a unit amount of a change Δf of the center frequency $f_c$ (=the slope of the linear function of each filter coefficient) is obtained previously and the slope is multiplied by the amount of change (shift amount) from the reference value of in center frequency $f_c$, it is possible to acquire the amount of a change in each filter coefficient for changing the center frequency $f_c$ from the reference value. By adding the acquired change amount to the filter coefficients when the reference value $f_r$ of the center frequency $f_c$ is obtained, the filter coefficient necessary for attaining an arbitrary center frequency f can be obtained.

With the structure shown in FIG. 2, the filter coefficients of a known N-order IIR digital bandpass elliptic filter whose center frequency is the reference $f_r$ are previously stored in the first memory 43.

Next, the slope of the liner equation of each filter coefficient is obtained using the filter coefficients of arbitrary two known N-order IIR digital bandpass elliptic filters, and the obtained slopes are previously stored in the second memory 45. For example, provided that the two filters respectively having the center frequencies of $f_a$ and $f_b$ (= $f_a$+nΔf) have filter coefficients {$a_{1i}(f_a)$, $a_{2i}(f_a)$, $b_{1i}(f_a)$} and {$a_{1i}(f_b)$, $a_{2i}(f_b)$, $b_{1i}(f_b)$}, the slopes of the linear equations are obtained from an equation 2 and are previously stored in the second memory 45.

$$k_{a1i}=[a_{1i}(f_b)-a_{1i}(f_a)]/(f_b-f_a)$$

$$k_{a2i}=[a_{2i}(f_b)-a_{2i}(f_a)]/(f_b-f_a)$$

$$k_{b1i}=[b_{1i}(f_b)-b_{1i}(f_a)]/(f_b-f_a) \quad (2)$$

$$i=1,2 \ldots, N/2$$

When the signal indicating a change in center frequency is supplied from the sensor 23, the MPU 22 obtains the difference ($f-f_r$) between the reference value $f_r$ of the center frequency and the changed center frequency f, and sends the difference to the multiplier 47. Further, the MPU 22 sequentially reads the slopes from the second memory 45 and supplies them to the multiplier 47. The multiplier 47 obtains the products of the shift amount ($f-f_r$) and the slopes, i.e., changes in the individual filter coefficients, $k_{a1i}(f-f_r)$, $k_{a2i}(f-f_r)$ and $k_{b1i}(f-f_r)$.

The obtained changes are supplied to the adder 49. The MPU 22 adds the filter coefficient values stored in the first memory 43 to an associated one of the multiplication results from the multiplier 47, to attain new filter coefficients as expressed by an equation 3 below.

$$a_{1i}(f)=k_{a1i}(f-f_r)+a_{1i}(f_r)$$

$$a_{2i}(f)=k_{a2i}(f-f_r)+a_{2i}(f_r)$$

$$b_{1i}(f)=k_{b1i}(f-f_r)+b_{1i}(f_r) \quad (3)$$

The MPU 22 sets the obtained filter coefficients $a_{1i}(f)$, $a_{2i}(f)$ and $b_{1i}(f)$ as new filter coefficients in the N-order IIR digital bandpass elliptic filter. Accordingly, the digital bandpass filter having the center frequency f is obtained.

The reference center frequency $f_r$ may be the aforementioned $f_a$ or $f_b$.

According to the digital bandpass filter 17 with this structure, in the case of an eight-order IIR digital bandpass elliptic filter system, for example, new filter coefficients can be obtained through 12 multiplications by the multiplier 47 and 12 additions by the adder 49. The center frequency can therefore be changed with a small amount of computation, resulting in fewer operations, there are few operational errors. As the first and second memories 43 and 45 merely store 24 pieces of data, they can have a small memory capacity.

The digital bandpass filter 17 may be constituted of an ordinary DSP (Digital Signal Processor).

One example of the structure of the digital demodulator 18 will now be discussed with reference to FIG. 4.

In FIG. 4, the digital demodulator 18 comprises a demultiplexer (DMUX) 61, a phase shift network system 63, a clock signal generator 64, a timing signals generator 65C, multipliers 66A and 66B, and a multiplexer (MUX) 62. The DMUX 61 successively distributes A/D converted digital signal x(t) to L number of sequences $x_1(t_1)$, $x_2(t_2)$, ..., $x_L(t_L)$ in accordance with sampling period t, where $$x_1(t_1) = x(t) \quad t_1 = [(t-1)/L]$$
$$x_2(t_2) = x(t) \quad t_2 = [(t-2)/L]$$
$$\ldots$$
$$x_L(t_L) = x(t) \quad t_L = [(t-L)/L]$$

and symbols [ ] expresses a positive integer number.

The two kinds of signals $x_{2j-1}(t_{2j-1})$ and $x_{2j}(t_{2j})$ from the DMUX 61 are input to the phase shift network system 63 which comprises L/2 number of phase shift networks 63(1) to 63(L/2), where j= 1, 2, ..., L/2. The two kinds of signals $x_{2j-1}(t_{2j-1})$ and $x_{2j}(t_{2j})$ are made to have a 90-degree phase difference by the phase shift networks 63(1) to 63(L/2). The phase shift networks 63(1) to 63(L/2) comprise respectively FILs 63(1)A and 63(1)B to 63(L/2)A and 63(L/2)B. The timing signals generator 65C generates timing signals expressed by $A(-1)^{(KL)/2+n}$ and/or $A(-1)^{((K-1)L)/2+n}$ in accordance with the sampling period t. The multipliers 66(1)A and 66(1)B, to 66(L/2)A and 66(L/2)B respectively multiply the output signals of the FILs 63(1)A and 63(1)B, to 63(L/2)A and 63(L/2)B in response to the timing signals. The MUX 62 selects and outputs the output signals of the multiplier 66(1)A and 66(1)B, to 66(L/2)A and 66(L/2)B in accordance with the sampling period t.

The FILs 63A and 63B are all-pass digital filter which have flat amplitude characteristics and have a 90-degree phase difference.

Where [(t−1)/L], [(t−2)/L], ..., [(t−L)/L] are positive integer numbers, A represents a fixed number, L represents an even number indicating the number of outputs of the DMUX 61, n represents a number of phase shift networks 63(1) to 63(L/2), K represents the number of period of distributing by the DMUX 61, and t represents the sampling period (t= 1, 2, 3, ... ). More particularly, the DMUX 61 delivers x(1) through the 1st sequence, x(2) through the 2nd sequence, and ... the L-th x(L) through the L-th sequence, (L+1)-th x(L+1) through the 1st sequence, ... For example, the delivered digital signal in the 1st sequence is $x_1(t_1)$ as denoted by:

$$x_1(t_1)=\{x(1), x(L+1), x(2L+1), \ldots \}$$

The delivered digital signal in the 2nd sequence is $x_2(t_2)$ as denoted by:

$$x_2(t_2)=\{x(2), x(L+2), x(2L+2), \ldots \}$$

The two outputs $x_1(t_1)$ and $x_2(t_2)$ from the demultiplex means are input to the phase shift network 63(1) to make a 90-degree phase difference between the two signals. The two outputs $y_1$ and $y_2$ from the phase shift network 63(1) are input to the multipliers 66(1)A and 66(1)B for multiplying the two timing signals respectively which are different or identical as expressed by:

$$A(-1)^{(KL)/2+1} \text{ and/or } A(-1)^{((K-1)L)/2+1}.$$

The outputs $z_1$ and $z_2$ of the multipliers 66(1)A and 66(1)B are input to the MUX 62.

The delivered digital signal in the (L−1)-th sequence is $x_{L-1}(t_{L-1})$ as denoted by:

$$x_{L-1}(t_{L-1})=\{x(L-1), x(2L-1), x(3L-1), \ldots \}$$

The delivered digital signal in the L-th sequence is $x_L(t_L)$ as denoted by:

$$x_L(t_L)=\{x(L), x(2L), x(3L), \ldots \}$$

The two outputs $x_{L-1}(t_{L-1})$ and $x_L(t_L)$ from the DMUX 61 are input to the phase shift network 63(L/2) to make a 90-degree phase difference between the two signals. The two outputs $y_{L-1}$ and $y_L$ from the phase shift network 63(L/2) are input to the multipliers 66(L/2)A and 66(L/2)B for multiplying the two timing signals respectively which are different or identical as expressed by:

$$A(-1)^{(KL)/2+(L/2)} \text{ and/or } A(-1)^{((K-1)L)/2+(L/2)}$$

The outputs $z_{L-1}$ and $z_L$ of the multipliers 66(L/2)A and 66(L/2)B are input to the MUX 62.

The output signals $z_1, z_2, \ldots, z_{L-1}$, and $z_L$ from the multipliers 66(1)A and 66(1)B, to 66(L/2)A and 66(L/2)B are selected in accordance with the sampling period t by the MUX 62.

The demodulation of the digital demodulator in FIG. 4 having the simplest structure with only one phase shift network (L= 2) as an example will be described specifically.

In FIG. 5, the output signal x(t) of the digital bandpass filter 17 is input to the DMUX 61. The digital signal x(t) is expressed by the following equation.

$$x(t) = \{x(1), x(2), x(3), x(4), x(5), \ldots\}$$

Where t represents the sampling period.

The DMUX 61 delivers x(1) through the 1st sequence, x(2) through the 2nd sequence, x(3) through the 1st sequence, x(4) through the 2nd sequence, and . . . , the (L−1)-th x(L−1) through the 1st sequence, L-th x(L) through the 2nd sequence . . .

The delivered digital signal $x_1(t_1)$ in the 1st sequence is expressed by:

$$x_1(t_1) = \{x(1), x(3), x(5), \ldots, x(L-1), \ldots\}$$

The delivered digital signal $x_2(t_2)$ in the 2nd sequence is expressed by:
$$x_2(t_2) = \{x(2), x(4), x(6), \ldots, x(L), \ldots\}$$

The frequency of the two signals $x_1(t_1)$ and $x_2(t_2)$ is ½ of the sampling frequency fs. The two outputs $y_1$ and $y_2$ of the FILs 63A and 63B are input to the multipliers 66A and 66B for multiplying (demodulating) the two timing signals from the timing signals generators 65A and 65B. The output signals $z_1$ and $z_2$ from the multipliers 66A and 66B are selected to produce a digital demodulated signal in accordance with the sampling period t by the MUX 62.

The multiplication (demodulation) will be explained in more details. The received signal is converted to a digital signal x(t) as denoted by:

$$x(t) = \{[\sin(\omega 1)], [\cos(\omega 2)], -[\sin(\omega 3)], -[\cos(\omega 4)], [\sin(\omega 5)], [\cos(\omega 6)], \ldots\}$$

The digital LSB signal x(t) is delivered through 2 (L=2) number of sequences in accordance with the sampling period t by the DMUX 61.

The delivered digital signal $x_1(t_1)$ in the 1st sequence is expressed by:

$$x_1(t_1) = \{[\sin(\omega 1)], -[\sin(\omega 3)], [\sin(\omega 5)], \ldots\}$$

The delivered digital signal $x_2(t_2)$ in the 2nd sequence is expressed by:

$$x_2(t_2) = \{[\cos(\omega 2)], -[\cos(\omega 4)], [\cos(\omega 6)], \ldots\}$$

The two signals $x_1(t_1)$ and $x_2(t_2)$ are input to the FILs 63A and 63B.

The outputs $y_1$ and $y_2$ of the FILs 63A and 63B are expressed by:

$$y_1 = \{[\sin(\omega 1 + \theta)], -[\sin(\omega 3 + \theta)], [\sin(\omega 5 + \theta)], \ldots\}$$

$$\begin{aligned}y_2 &= \{[\cos(\omega 2 + \theta + \pi/2)], -[\cos(\omega 4 + \theta + \pi/2)], \\ &\quad [\cos(\omega 6 + \theta + \pi/2)], \ldots\} \\ &= \{-[\sin(\omega 2 + \theta)], [\sin(\omega 4 + \theta)], -[\sin(\omega 6 + \theta)], \ldots\}\end{aligned}$$

The obtained signals $y_1$ and $y_2$ are multiplied by the timing signals from the timing signals generators 65A and 65B.

If the two timing signals are identical, the received signal is demodulated on the LSB side. For example, the timing signals are identical as denoted by:

$$(-1)^{K+1} = \{1, -1, 1, -1, \ldots\}$$

The two outputs $z_{11}$ and $z_{12}$ of the multipliers 66A and 66B are expressed by:

$$\begin{aligned}z_{11} &= \{\sin(\omega t + \theta)\} \times (-1)^{K+1} \\ &= \{[\sin(\omega 1 + \theta)], [\sin(\omega 3 + \theta)], [\sin(\omega 5 + \theta)], \ldots\}\end{aligned}$$

$$\begin{aligned}z_{12} &= \{-\sin(\omega t + \theta)\} \times (-1)^{K+1} \\ &= \{-[\sin(\omega 2 + \theta)], -[\sin(\omega 4 + \theta)], -[\sin(\omega 6 + \theta)], \ldots\}\end{aligned}$$

The two outputs $z_{11}$ and $z_{12}$ of the multipliers 66A and 66B are selected to demodulate a demodulated signal $z_1$ by the MUX 62.

The demodulated signal $z_1$ is expressed by:

$$z_1 = \{[\sin(\omega 1 + \theta)], -[\sin(\omega 2 + \theta)], [\sin(\omega 3 + \theta)], -[\sin(\omega 4 + \theta)], [\sin(\omega 5 + \theta)], -[\sin(\omega 6 + \theta)], \ldots\}$$

Similarly, when the timing signals are not identical or opposite to each other, the received signal is demodulated on the USB side. For example, the timing signals are identical as denoted by:

$$(-1)^{K+1} = \{1, -1, 1, -1, \ldots\}$$

and $$(-1)^{K} = \{-1, 1, -1, 1, \ldots\}$$

The two outputs $z_{u1}$ and $z_{u2}$ of the multipliers 66A and 66B are expressed by:

$$\begin{aligned}z_{11} &= \{\sin(\omega t + \theta)\} \times (-1)^{K+1} \\ &= \{[\sin(\omega 1 + \theta)], [\sin(\omega 3 + \theta)], [\sin(\omega 5 + \theta)], \ldots\}\end{aligned}$$

$$\begin{aligned}z_{12} &= \{-\sin(\omega t + \theta)\} \times (-1)^{K+1} \\ &= \{[\sin(\omega + \theta)], [\sin(\omega 4 + \theta)], [\sin(\omega 6 + \theta)], \ldots\}\end{aligned}$$

The two outputs $z_{u1}$ and $z_{u2}$ of the multipliers 66A and 66B are selected to demodulate a demodulated signal $z_u$ by MUX 62.

The demodulated signal $z_u$ is expressed by:

$$z_u = \{[\sin(\omega + \theta)], [\sin(\omega 2 + \theta)], [\sin(\omega 3 + \theta)], [\sin(\omega 4 + \theta)], [\sin(\omega 5 + \theta)], [\sin(\omega 6 + \theta)], \ldots\}$$

It is apparent that the original signal has been demodulated.

The demodulator with the structures shown in FIGS. 4 and 5 have a high processing efficiency and have less deterioration of the signal processing characteristics. It is thus possible to provide a CW radio communication system which has an excellent efficiency with less deterioration.

The structures of the digital bandpass filter 17 and the digital demodulator 18 are not limited to those of the above-described embodiment, but may be modified and adapted in various forms.

According to the present invention, as discussed above, the interference wave whose frequency is located close to the target reception frequency can be attenuated and the target signal can be received with a high sensitivity.

To alter the demodulation frequency, the frequency of the first oscillator is changed and the center frequency of the digital filter is also changed. Accordingly, the frequency of the IF signal can always coincide with the center frequency of the digital filter. Even if the demodulation frequency is altered, therefore, the target received signal is not attenuated, eliminating the need for re-tuning.

Further, the variable center frequency digital bandpass filter is located at the intermediate frequency stage before the digital demodulator. With the carrier frequency set to $f_s/4$ ($f_s$ is the sampling frequency), particularly, therefore, the bandwidth does not change even if the center frequency is changed and the filter shape hardly changes. If the coefficient of the digital filter is previously determined by an approximation equation, the correction of the filter coefficient is required less.

What is claimed is:

1. A radio communication system comprising:

reception means for receiving a radio frequency signal and outputs a received signal;

a variable frequency local oscillator;

a mixer for mixing said received signal from said reception means with a local oscillator signal from said variable frequency local oscillator;

an analog-digital converter for converting an output signal of said mixer to a digital signal;

a variable center frequency digital bandpass filter for filtering an output signal of said analog-digital converter;

a digital demodulator for demodulating an output signal of said digital bandpass filter; and control means for changing a frequency of said local oscillator signal by $\Delta f$ and changing a center frequency of said digital bandpass filter by $\Delta f$ in accordance with an externally supplied control signal to cause a frequency of said output signal of said mixer to substantially coincide with said center frequency of said passband of said digital bandpass filter.

2. The radio communication system according to claim 1, further comprising:

a digital-analog converter for converting a digital output signal of said digital demodulator to an analog signal;

amplifying means for amplifying an output signal of said digital-analog converter;

means for converting an output signal of said amplifying means to an audible sound and outputting the audible sound; and means for supplying said control signal to said control means.

3. A radio communication system comprising:

reception means for receiving a continuous wave radio frequency signal and outputs a received signal;

a variable frequency local oscillator;

a mixer for mixing said received signal from said reception means with a local oscillator signal from said variable frequency local oscillator;

an analog-digital converter for converting an output signal of said mixer to a digital signal;

a variable center frequency digital bandpass filter for filtering an output signal of said analog-digital converter;

a digital demodulator for demodulating an output signal of said digital bandpass filter;

a means for inputting a pitch control signal; and control means for changing a frequency of the oscillator signal and changing a center frequency of said digital bandpass filter in accordance with said pitch control signal.

4. The radio communication system according to claim 3, further comprising:

a digital-analog converter for converting a digital output signal of said digital demodulator to an analog signal;

amplifying means for amplifying an output signal of said digital-analog converter; and means for converting an output signal of said amplifying means to an audible sound and outputting the audible sound.

* * * * *